(12) United States Patent
Kolbas et al.

(10) Patent No.: US 6,201,678 B1
(45) Date of Patent: Mar. 13, 2001

(54) HIGH-VOLTAGE SWITCH GEAR PROTECTION CIRCUIT

(75) Inventors: Richard Bernhart Kolbas, Plymouth; Donald Paul Bilger, Livonia; Andrew Matzkin-Bridger, West Bloomfield, all of MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/272,475

(22) Filed: Mar. 19, 1999

(51) Int. Cl.[7] ..................................................... H02H 3/00
(52) U.S. Cl. ................................. 361/93.5; 361/5; 361/8
(58) Field of Search ............................... 361/93.1, 93.5, 361/93.6, 93.7, 94, 2–3, 5, 8–9, 13, 58

(56) References Cited

U.S. PATENT DOCUMENTS

| | | | |
|---|---|---|---|
| 3,529,210 | * | 9/1970 | Ito et al. ................................. 361/58 |
| 3,737,724 | * | 6/1973 | Salge et al. .............................. 361/8 |
| 3,758,790 | * | 9/1973 | Kind et al. ............................. 307/136 |
| 3,809,959 | * | 5/1974 | Pucher .................................... 361/8 |
| 4,005,340 | * | 1/1977 | Hartel ..................................... 361/3 |
| 4,172,268 | * | 10/1979 | Yanabu et al. .......................... 361/4 |
| 4,583,146 | * | 4/1986 | Howell ................................. 361/13 |
| 5,666,254 | * | 9/1997 | Thomas et al. ......................... 361/8 |
| 5,805,393 | * | 9/1998 | Thomas .................................. 361/6 |

* cited by examiner

Primary Examiner—Michael J. Sherry
(74) Attorney, Agent, or Firm—Brooks & Kushman P.C.

(57) ABSTRACT

A switch gear protection circuit for use in electric vehicles provides parallel circuit pathways for selectively coupling a power source to a capacitive load. A first pathway includes a main switch element that preferably is a high-current contactor or a high-current, low-voltage relay switch. A second pathway, which is in parallel with the first pathway, includes a low-voltage, low-current switch element in series with a circuit breaker element such as a fuse. When it is desirable to open the main switch element in the first pathway, the second pathway is closed. Once the second pathway is closed, the voltage drop across the first pathway is reduced and the first switch element can be opened. The parallel arrangement provides the ability to use low-voltage switch elements, that are relatively inexpensive compared to high-voltage components.

16 Claims, 1 Drawing Sheet

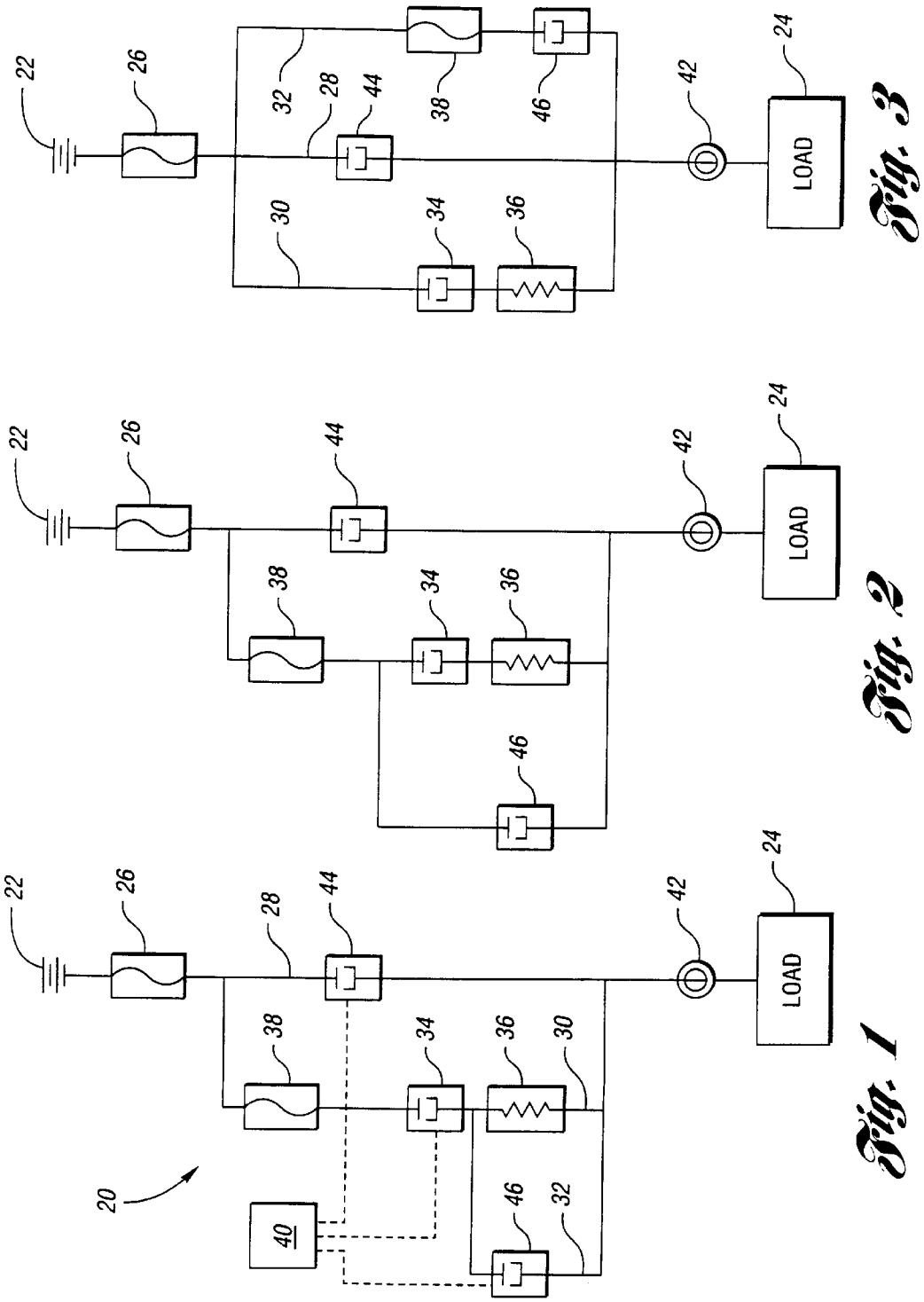

HIGH-VOLTAGE SWITCH GEAR PROTECTION CIRCUIT

BACKGROUND OF THE INVENTION

This invention generally relates to a switching circuit and more particularly to a circuit used as a switch gear circuit in electric vehicles for controlling capacitive loads.

Electric vehicles typically include switch gear circuits designed to control power supply and usage of capacitive loads. In most arrangements a precharge circuit pathway is provided for charging a capacitive load by selectively coupling it with a power source. After the capacitive load is charged sufficiently, a main circuit pathway, which is in parallel with the precharge pathway, connects the power source to the load. After a preselected amount of time, the precharge circuit pathway is opened while the main pathway remains closed.

In typical situations it becomes necessary to disconnect the capacitive load from the power source. Therefore, a relay that can consistently break large currents at high voltages has been included in the main pathway. While such an arrangement has proven usable, those skilled in the art are always striving to make improvements. One improvement that could be made is to use less-expensive components, which would make the overall system more economical.

This invention provides a circuit arrangement that eliminates the need for a relatively expensive high-voltage relay switch in the main circuit pathway. This invention replaces the relatively expensive component with a very low cost arrangement that is reliable and economical.

SUMMARY OF THE INVENTION

In general terms, this invention is a switch gear circuit for use in electrical vehicles. The circuit is useful for selectively connecting a power source with a capacitive load and especially for making failsafe disconnections. A first circuit pathway includes a first switch element that is selectively closed to allow current to flow between the power source and the load. The first switch element is selectively opened only when the voltage across the switch element is less than a predetermined threshold value. A second pathway in parallel with the first includes a second switch element in series with a circuit breaker element. The second switch element is selectively closed to allow current to flow through the second pathway so that the voltage across the first switched element becomes less than the predetermined threshold value, which allows the first switch element to be selectively opened. The second switch element, which is protected from potentially damaging high currents by the circuit breaker element, is later opened to completely disconnect the power source from the load.

Providing a parallel second pathway allows for a high-current, low-voltage relay switch or contactor to be used in the main pathway, which presents a substantial savings compared to conventional high-voltage relay switches that would otherwise be required.

The various features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a schematic illustration of a circuit designed according to this invention.

FIG. 2 is a modified version of the embodiment of FIG. 1.

FIG. 3 is another embodiment of a circuit designed according to this invention.

DETAILED DESCRIPTION OF THE PREFERRED EMBODIMENT

FIG. 1 illustrates a switch gear protection circuit 20 for selectively coupling a power source 22 to a capacitive load 24. A first circuit breaker element 26 is in series with the power source 22. The circuit breaker element 26 preferably is a fuse and most preferably a fuse sized to handle the maximum normal current load without clearing. Three parallel circuit pathways 28, 30 and 32 are arranged between the first circuit breaker element 26 and the load 24.

The circuit pathway 30 is referred to as a precharge pathway because it is used to precharge the load 24. The precharge pathway 30 includes a switch element 34 in series with a resistive element 36. The switch element 34 preferably is a low-current contactor or low-current, low voltage relay switch. A second circuit breaker element 38 preferably is in series with the switch element 34 to protect the switch element from unusually high currents. The second circuit breaker element 38 preferably is a fuse that allows a maximum current flow at a level that will not damage the switch element 34 or the resistive element 36.

A control circuit module 40 selectively closes the switch 34 to allow the capacitive load 24 to be charged. A conventional current sensor 42 is placed within the circuit as illustrated to provide the control circuit module 40 information regarding the status of the circuit. Once the load 24 has been sufficiently charged, the control circuit module 40 closes a main switch element 44. A preselected amount of time later, the precharge switch element 34 is opened and the conductive pathway 28 allows current to flow from the power source 22 to the load 24.

The main switch element 44 can be a contactor or a relay switch. A high-current, low-voltage relay switch is most preferred because it is substantially more economical than a high-voltage contactor. Since the main switch element 44 can only be opened when the voltage drop across it is low, the circuit 20 includes the third parallel pathway 32.

When it is desirable to disconnect the power source 22 from the load 24 and the current flowing through the pathway 28 invoices too great of a voltage drop for the switch element 44 to be opened, the control circuit module 40 closes the switch element 34 and the switch element 46, which preferably is a low-current contactor or low-voltage, low-current relay switch. The impedance along the circuit pathway 32 is low. Therefore, closing the switches 34 and 46 limits the voltage drop across the main pathway 28 so that the main switch element 44 can be opened. To complete the disconnect operation, the switch elements 34 and 46 are opened.

Under most scenarios, the capacitive load 24 will be fully charged when it is desirable to disconnect it from the power source 22. Therefore, the voltage drop across the circuit pathways will be relatively low and the amount of current flowing will be low, also. Under these conditions it will be possible to control the low-voltage contactors or relay switches 44 and 46 as just described.

Under some fault conditions requiring an emergency power off sequence, relatively high currents may be present. The circuit breaker element 38 is provided to protect the secondary switch element 46 and the switch element 34 from unusually high currents. Once the fuse element 38 is cleared, the circuit is opened and the desired disconnect operation is completed. Obviously, the circuit breaker element 38 will need to be reset or replaced for a subsequent charging operation. Accordingly, it will be possible to detect when the circuit breaker element 38 has cleared because a later precharge operation will not be possible.

The circuit in FIG. 2 is essentially the same as that described above with the exception that the secondary switch element 46 is connected in parallel across the series combination of the precharge switch 34 and the resistive element 36. This embodiment allows the shut down and the emergency power off sequences to be handled without having to close the precharge switch 34 as described above. Otherwise, the function and operation of the circuit in FIG. 2 is the same as that in FIG. 1.

FIG. 3 illustrates another embodiment of this invention where the circuit breaker element 38 is in series with the secondary switch 46. That series arrangement is in parallel with the precharge circuit 30 and the main pathway 28. This embodiment works essentially the same as that described above with the exception that if the circuit breaker element 38 is cleared, a subsequent precharge operation will still be possible because the circuit breaker 38 is no longer in series with the precharge switch element 34.

This invention provides the significant advantage of allowing the use of relatively low cost, low-voltage relay switches in place of high-voltage relay switches that were used in prior configurations. Since a plurality of such circuits may need to be included in electric vehicle contactor boxes, this invention provides a significant overall cost savings.

The foregoing description is exemplary rather than limiting in nature. Variations and modifications of the disclosed embodiments may become apparent to those skilled in the art that do not necessarily depart from the purview and spirit of this invention. The scope of legal protection given to this invention can only be determined by studying the following claims.

We claim:

1. A switch gear circuit for use in electric vehicles, comprising:
    a power source;
    a capacitive load;
    a circuit breaker element in series with said power source between said power source and said load and configured to open said circuit when a current flow through said circuit breaker element exceeds a first preselected maximum;
    a first pathway having a first switch element that is selectively closed to allow current flow between said power source and said load and opened only when a voltage drop across said first switch element is less than a predetermined threshold value; and
    a second pathway in parallel with said first pathway and including a second switch element in series with a second circuit breaker element that is configured to open when a current flow through said second circuit breaker element exceeds a second preselected maximum, said second switch element being selectively closed to allow current to flow through said second pathway so that said voltage drop across said first switch element becomes less than said predetermined threshold value to thereby allow said first switch element to be selectively opened.

2. The circuit of claim 1, further comprising a precharge pathway in parallel with said first pathway and including a precharge switch element that is selectively closed to complete said precharge circuit pathway so that said load is charged by said power source, said precharge pathway further including a resistive element in series with said precharge switch element to control a rate at which said load is charged.

3. The circuit of claim 2, wherein said second pathway is connected in parallel across said precharge pathway.

4. The circuit of claim 2, wherein said second switch element is connected in parallel across said resistive element.

5. The circuit of claim 2, wherein said second circuit breaker element is in series with a parallel arrangement of said second switch element and said precharge pathway.

6. The circuit of claim 1, wherein said first switch element comprises a contactor that is selectively opened from a closed posture only when current flowing through said contactor has a relatively low value.

7. The circuit of claim 1, wherein said first switch element comprises a relay switch that is selectively opened from a closed posture only when current flowing through said relay switch has a relatively low value.

8. The circuit of claim 1, wherein said second switch element comprises a contactor.

9. The circuit of claim 1, wherein said second switch element comprises a relay switch.

10. The circuit of claim 1, wherein said first and second circuit breaker elements comprise fuses, respectively, and wherein said first preselected maximum is greater than said second preselected maximum.

11. The circuit of claim 1, further comprising a control module that is coupled to said switch elements and selectively opens and closes said switch elements.

12. The circuit of claim 11, further comprising a current detector that detects an amount of current flowing between said power source and said load and wherein said control module is responsive to the detected amount of current.

13. A method of controlling a switch gear circuit in an electric vehicle having a capacitive load that is selectively coupled to a power source through a plurality of pathways, comprising the steps of:
    (A) precharging the capacitive load by selectively coupling said load to a power source through a first connection;
    (B) coupling the capacitive load to the power source through a second connection that is in parallel to the first connection after performing step (A) for a first preselected time period;
    (C) disconnecting the first connection after performing step (B);
    (D) selectively coupling the capacitive load to the power source through a third connection that is in parallel to the second connection;
    (E) disconnecting the second connection after performing step (D); and
    (F) disconnecting the third connection a second preselected time period after performing step (E).

14. The method of claim 13, wherein the second connection comprises a switch element that is opened only when a current flowing through said switch element is below a predetermined threshold value and wherein step (B) is performed by selectively closing said switch element.

15. The method of claim 14, wherein the third connection comprises a third switch element in series with a circuit breaker element and wherein step (D) is performed by closing the third switch element to allow current to flow through the third connection to thereby allow the current flowing through the second switch element to decrease below the threshold value.

16. The method of claim 13, further comprising the step of determining an amount of current flowing between the power source and the capacitive load and performing steps (B) through (E) depending on the amount of current that is determined.

* * * * *